(12) United States Patent
Seike et al.

(10) Patent No.: US 10,392,790 B2
(45) Date of Patent: Aug. 27, 2019

(54) FLUSH TOILET

(71) Applicant: LIXIL Corporation, Tokyo (JP)

(72) Inventors: Reo Seike, Tokyo (JP); Kouji Fukuya, Tokyo (JP); Kazuya Yashima, Tokyo (JP); Takamasa Ina, Tokyo (JP); Yousuke Ban, Tokyo (JP)

(73) Assignee: LIXIL Corporation, Tokyo (JP)

( * ) Notice: Subject to any disclaimer, the term of this patent is extended or adjusted under 35 U.S.C. 154(b) by 0 days.

(21) Appl. No.: 15/755,545

(22) PCT Filed: Aug. 29, 2016

(86) PCT No.: PCT/JP2016/075156
§ 371 (c)(1),
(2) Date: Feb. 26, 2018

(87) PCT Pub. No.: WO2017/038746
PCT Pub. Date: Mar. 9, 2017

(65) Prior Publication Data
US 2018/0245324 A1   Aug. 30, 2018

(30) Foreign Application Priority Data
Aug. 31, 2015   (JP) .................................. 2015-171217

(51) Int. Cl.
*E03D 9/00*   (2006.01)
*E03D 11/13*   (2006.01)
*F16K 1/16*   (2006.01)
*F16K 31/06*   (2006.01)
*F16K 31/44*   (2006.01)
*E03D 11/10*   (2006.01)

(52) U.S. Cl.
CPC .............. *E03D 9/005* (2013.01); *E03D 11/10* (2013.01); *E03D 11/13* (2013.01); *F16K 1/16* (2013.01); *F16K 31/0675* (2013.01); *F16K 31/44* (2013.01)

(58) Field of Classification Search
CPC ..................................................... E03D 11/13
USPC ........................................................ 4/420.5
See application file for complete search history.

(56) References Cited

U.S. PATENT DOCUMENTS 7,284,286 B1   10/2007  Kopplin et al.
2013/0025039 A1   1/2013  Armstrong

FOREIGN PATENT DOCUMENTS

JP   2000-8464   1/2000
JP   2010-504450   2/2010
JP   2012-107490   6/2012
(Continued)

OTHER PUBLICATIONS

Notice of Reasons for Rejection dated Jul. 17, 2018, directed to JP Application No. 2015-171217; 6 pages.
(Continued)

*Primary Examiner* — Lori L Baker
(74) *Attorney, Agent, or Firm* — Morrison & Foerster LLP

(57) ABSTRACT

A flush toilet of the present invention includes a bowl; a toilet drainage water pathway which communicates with the bowl and a drainage water socket and into which a cleaning water flows from the bowl; and a valve portion which includes a rotating axis and a flapper, and which is configured to open and close the toilet drainage water pathway, the rotating axis being provided in the toilet drainage water
(Continued)

pathway, the flapper being connected to the rotating axis and being provided so as to be capable of rotating about the rotating axis.

6 Claims, 14 Drawing Sheets

(56) References Cited

FOREIGN PATENT DOCUMENTS

| | | |
|---|---|---|
| JP | 2013-227852 | 11/2013 |
| KR | 10-2009-0113201 | 10/2009 |

OTHER PUBLICATIONS

International Search Report dated Oct. 25, 2016, directed to International Application No. PCT/JP2016/075156; 2 pages.

FLUSH TOILET

REFERENCE TO RELATED APPLICATIONS

This application is a national stage application under 35 USC 371 of International Application No. PCT/JP2016/075156, filed Aug. 29, 2016, which claims the priority of Japanese Application No. 2015-171217, filed Aug. 31, 2015, the entire contents of each of which are incorporated herein by reference.

FIELD OF THE INVENTION

The present invention relates to a flush toilet.

BACKGROUND OF THE INVENTION

In a conventional flush toilet in which a cleaning water supply device is driven by electric power, there is a case in which when a power outage occurs, the cleaning of the toilet bowl is not performed because the cleaning water supply device cannot work. To solve this problem, for example, a flush toilet bowl is disclosed in Patent Document 1. In the flush toilet bowl, when the power outage occurs, i) cleaning water is supplied by an electrical drive, ii) a valve in a drainage water socket is opened and closed by any one of manual operation, backup power, and mechanical elements, and iii) water is stored in a bowl portion and cleaning is performed.

Patent Document 1: Japanese Unexamined Patent Application, First Publication No. 2013-227852

SUMMARY OF THE INVENTION

In the flush toilet bowl disclosed in Patent Document 1, an electric power source to open and close an electromagnetic valve is necessary. Therefore, there is a problem in which the flush toilet bowl cannot be cleaned because the electromagnetic valve cannot open and close, for example, when a breakdown of an electrical system by the power outage (for example, the power outage is caused by lightning) occurs. The shape of drainage water sockets differ according to a S-trap (drainage water socket is connected to a floor) and a P-trap (drainage water socket is connected to a wall). In the flush toilet bowl disclosed in Patent Document 1, there is a problem in which it is necessary to provide an open-and-close valve for each drainage water socket of a S-trap toilet and a P-trap toilet because the open-and-close valve is provided inside the drainage water socket.

The present invention is contrived in view of such circumstances, and an object thereof is to provide a flush toilet which includes parts that can be used in common in the S-trap toilet and the P-trap toilet and in which the versatility can be enhanced.

A flush toilet according to a first aspect of the present invention includes: a bowl; a toilet drainage water pathway which communicates with the bowl and a drainage water socket and into which a cleaning water flows from the bowl; and a valve portion which includes a rotating axis and a flapper, and which is configured to open and close the toilet drainage water pathway, the rotating axis being provided in the toilet drainage water pathway, the flapper being connected to the rotating axis and being provided so as to be capable of rotating about the rotating axis.

According to the present invention, because the valve portion is provided in the toilet drainage water pathway, even if the position of the discharge pipe that is provided in a setting place of the flush toilet is provided in the floor (drainage water socket is connected to the floor) and even if the position of the discharge pipe is provided in the wall (drainage water socket is connected to the wall), it is not necessary to change the configuration of the valve portion. Accordingly, most of parts of the toilet in which the drainage water socket is connected to the floor and the toilet in which the drainage water socket is connected to the wall can be common and the versatility can be enhanced.

According to a second aspect of the present invention in the first aspect of the flush toilet, the valve portion may include a valve portion main body which configures a portion of a toilet drainage water pathway. The rotating axis and the flapper may be provided in the valve portion main body. The valve portion main body and the flapper may be made of resin.

According to the present invention, the valve portion and the flapper that are made of resin can be provided in a part of the toilet drainage water pathway. Consequently, although it is difficult to provide the valve portion in the toilet drainage water pathway in a conventional toilet, it can provide the valve portion in the toilet drainage water pathway in the flush toilet of the present invention.

According to a third aspect of the present invention in the second aspect of the flush toilet, the valve portion main body may be formed as a single body.

According to the present invention, because the valve main body is made of resin and is integrally formed, there is not a join or the like of the drainage line. Accordingly, it can prevent sewage water and a waste from adhering to the toilet drainage water pathway.

According to a fourth aspect of the present invention in any one of the first aspect to the third aspect of the flush toilet, the rotating axis and a connection part between the rotating axis and the flapper may be provided in a top part.

According to the present invention, the connection part between the rotating axis and the flapper is provided in the top part of the toilet drainage water pathway in which the sewage water and the waste make it difficult to reach when during draining. Accordingly, it prevents the sewage water and the waste from adhering to the connection part.

According to a fifth aspect of the present invention in any one of the second aspect to the fourth aspect of the flush toilet, an enlarging part which has an upper portion which is larger than an upstream side at least in a height direction may be provided in a conduit in which the cleaning water of the valve portion main body flows. The enlarging part may include the rotating axis and a connection part between the rotating axis and the flapper.

According to the present invention, because the upper portion of the conduit of the enlarging part is formed to be larger than the upstream side in the downward side, it is difficult for the sewage water and the waste to reach the enlarging part when during draining. Because the connection part between the rotating axis and the flapper is provided in this enlarging part, it can prevent the sewage water and the waste from adhering between the rotating axis and the connection part of the flapper.

According to a sixth aspect of the present invention in any one of the first aspect to the fifth aspect of the flush toilet, the valve portion may be configured such that a gap is formed between an inner wall of the toilet drainage water pathway and a peripheral part of the flapper in a state where the flapper is open.

According to the present invention, because the space is formed between the inner wall of the toilet drainage water pathway and the peripheral part of the flapper in the state where the flapper is the open state, a siphon effect can be enhanced during draining of the cleaning water and it is easy to control the flow of discharged water during draining.

According to a seventh aspect of the present invention in any one of the first aspect to the fifth aspect of the flush toilet, the valve portion may be configured so as to maintain a watertight seal between an inner wall of the toilet drainage water pathway and a peripheral part of the flapper that faces the inner wall of the toilet drainage water pathway in a state where the flapper is open.

According to the present invention, because this configuration maintains a watertight seal between the peripheral part of the flapper and the inner wall of the toilet drainage water pathway, it can prevent the sewage water and the waste from flowing in between the flapper and the inner wall of the toilet drainage water pathway and it can prevent the sewage water and the waste from adhering between the inner wall of the toilet drainage water pathway and the flapper.

According to the flush toilet of the present invention, the cleaning of the bowl can be performed without using an electric power when the power outage occurs, and most of parts of the toilet in which the drainage water socket is connected to the floor and the toilet in which the drainage water socket is connected to the wall can be common and the versatility can be enhanced.

DETAILED DESCRIPTION OF THE INVENTION

Figure 1:
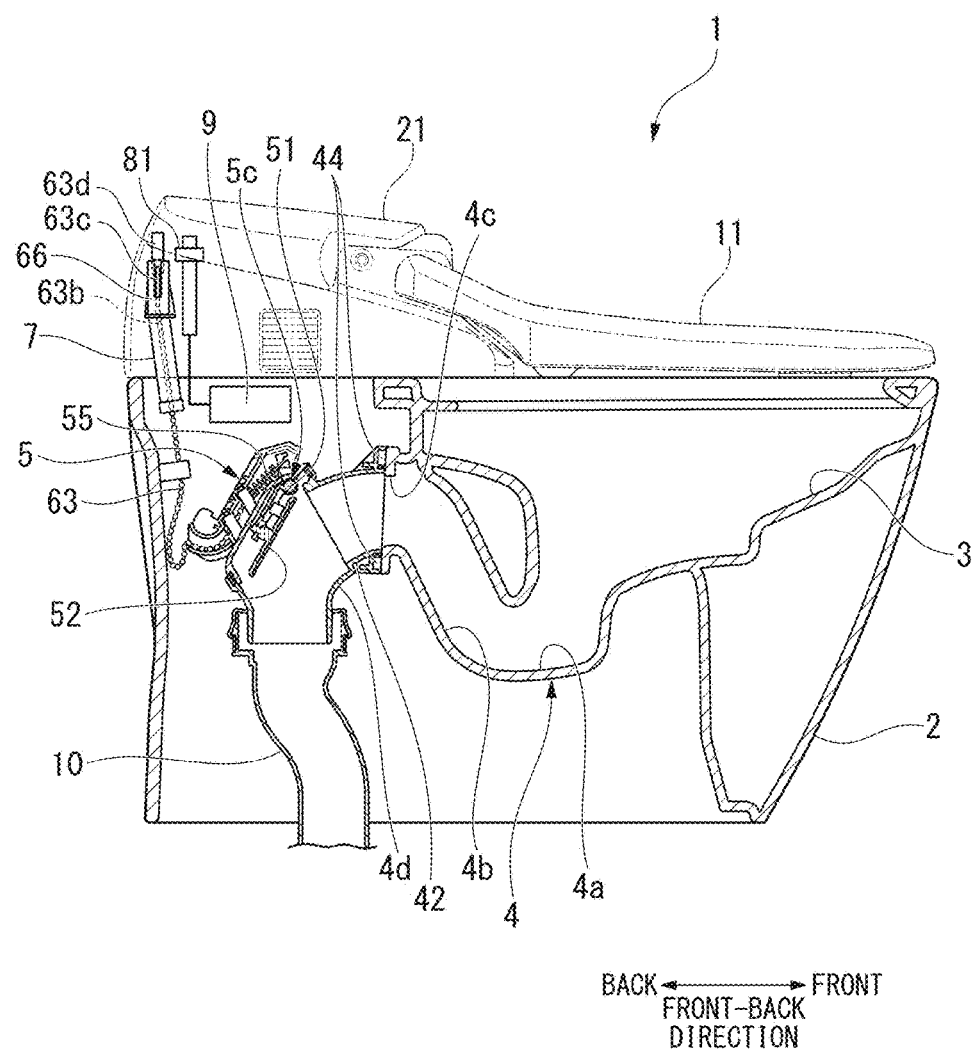
FIG. 1 is a cross-sectional view showing a flush toilet of the present invention.
Figure 2:
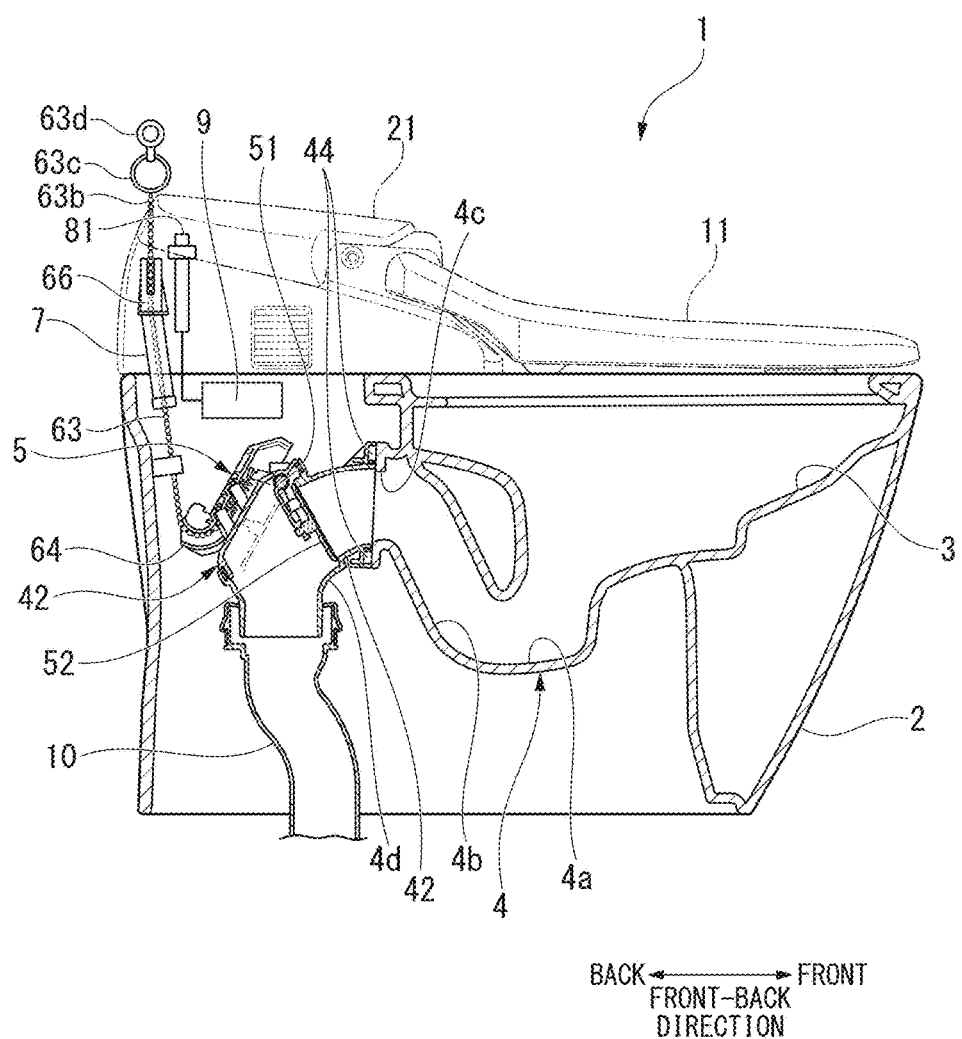
FIG. 2 is a cross-sectional view showing the flush toilet of the present invention.

One embodiment of the present invention will be described. FIGS. 1 and 2 are cross-sectional views showing a flush toilet 1 of a present invention. An open state of a valve portion is shown in FIG. 1, and a closed state of the valve portion is shown in FIG. 2.

The flush toilet 1 of the present invention, as shown in FIGS. 1 and 2 is a western style toilet of a siphon wash-out type and includes a toilet main body 2, a bowl 3, a toilet drainage water pathway 4, a valve portion 5, a drainage water socket 10, and a toilet seat 11. The toilet main body 2, a bowl 3, and a portion of a toilet drainage water pathway 4 are made of ceramic and are formed integrally. The toilet drainage water pathway 4 and the drainage water socket 10 configure a drainage line.

In the following description, the direction of the face of a user who is sitting on the toilet seat faces is referred to as the front, and the direction of the back of a user who is sitting on the toilet seat faces is referred to as the back.

As shown in FIG. 1, the toilet drainage water pathway 4 communicates with an opening of a lower portion of the bowl 3 and a downstream side of the toilet drainage water pathway 4 is communicated with the drainage water socket 10. The toilet drainage water pathway 4 includes a pooled water part 4a, a rising part 4b, a top part 4c, a descending part 4d in this order from an upstream of a flow path of cleaning water.

Figure 3:
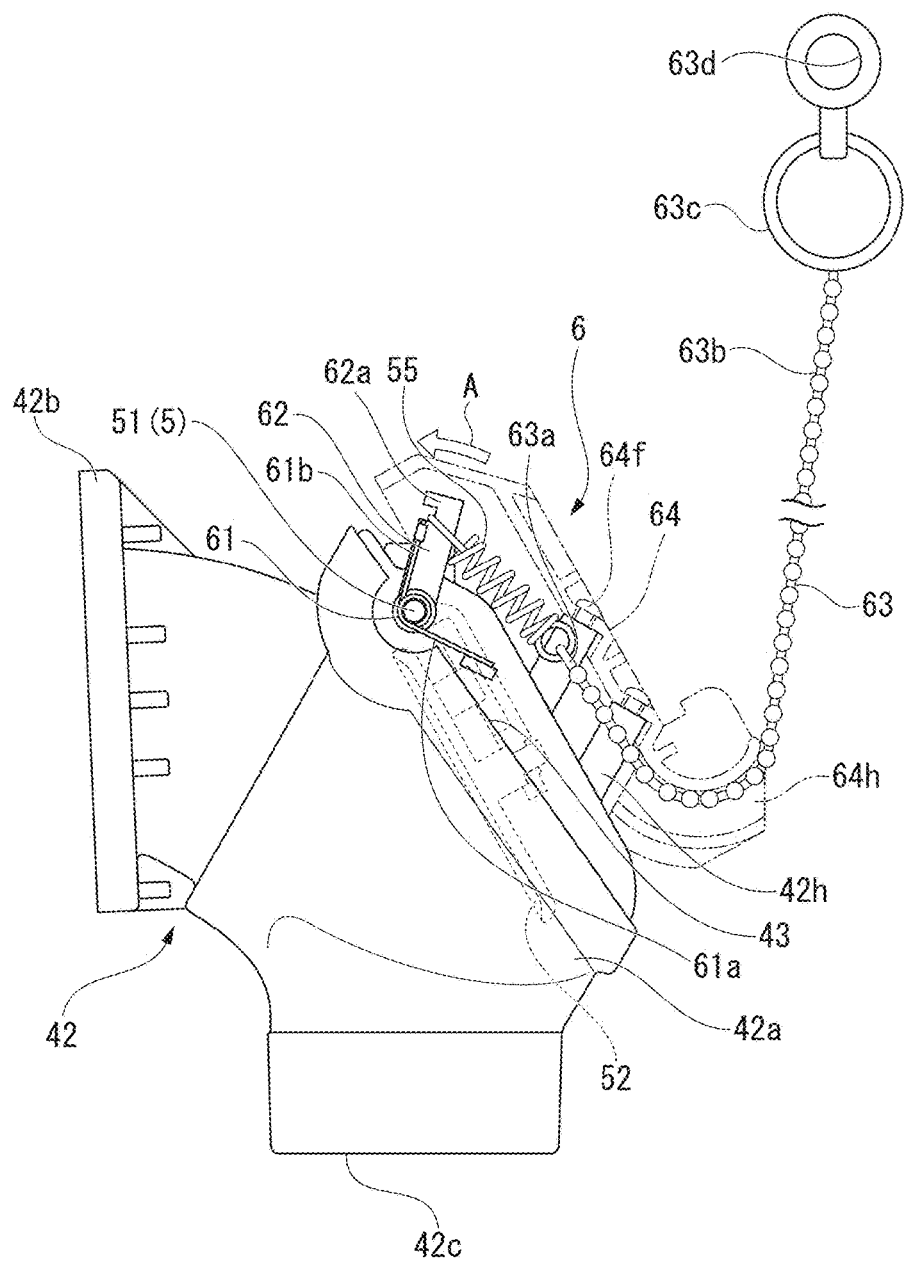
FIG. 3 is a side view of a valve portion of the present invention.
Figure 4:
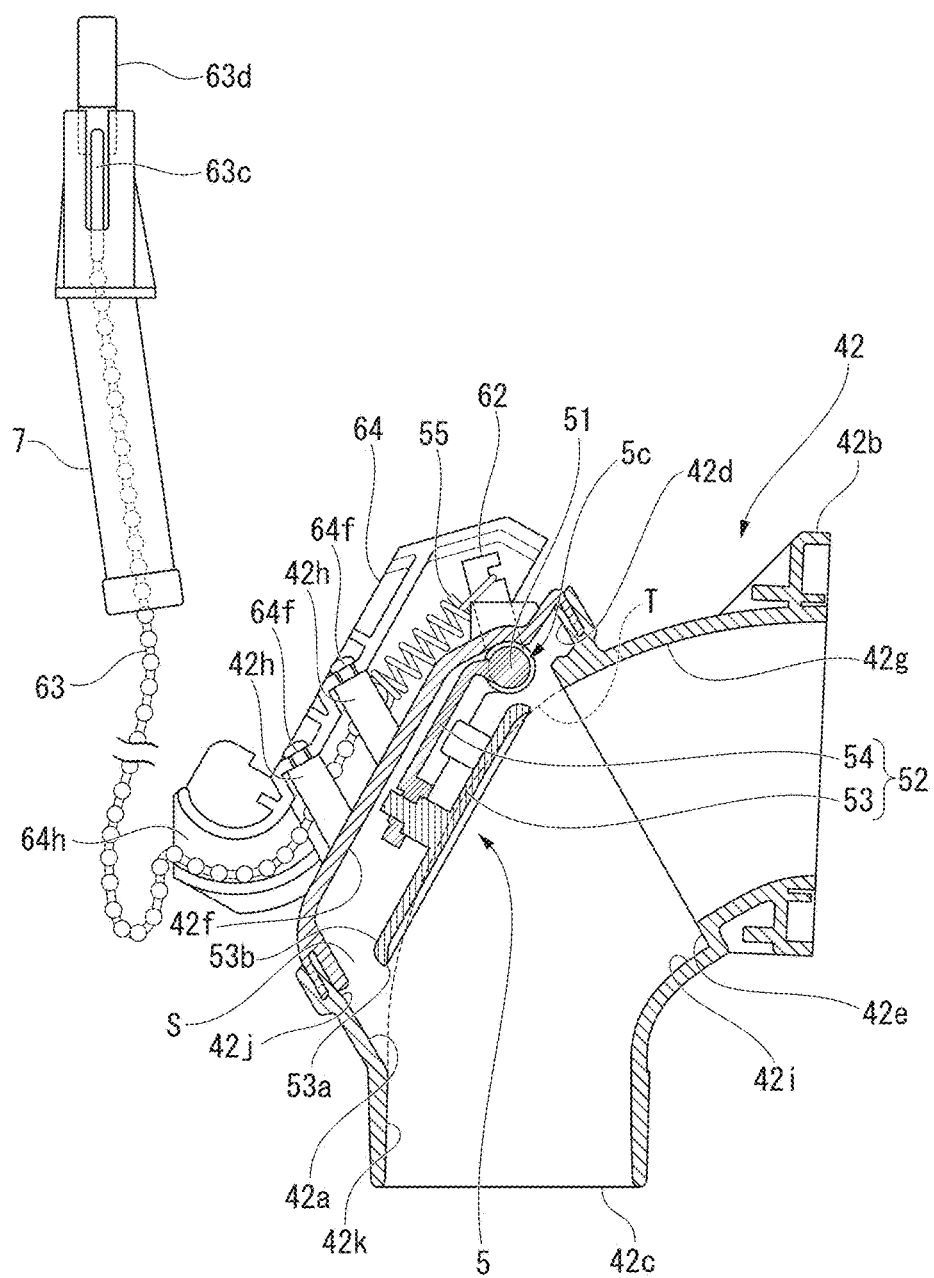
FIG. 4 is a cross-sectional view of the valve portion of the present invention.
Figure 5:
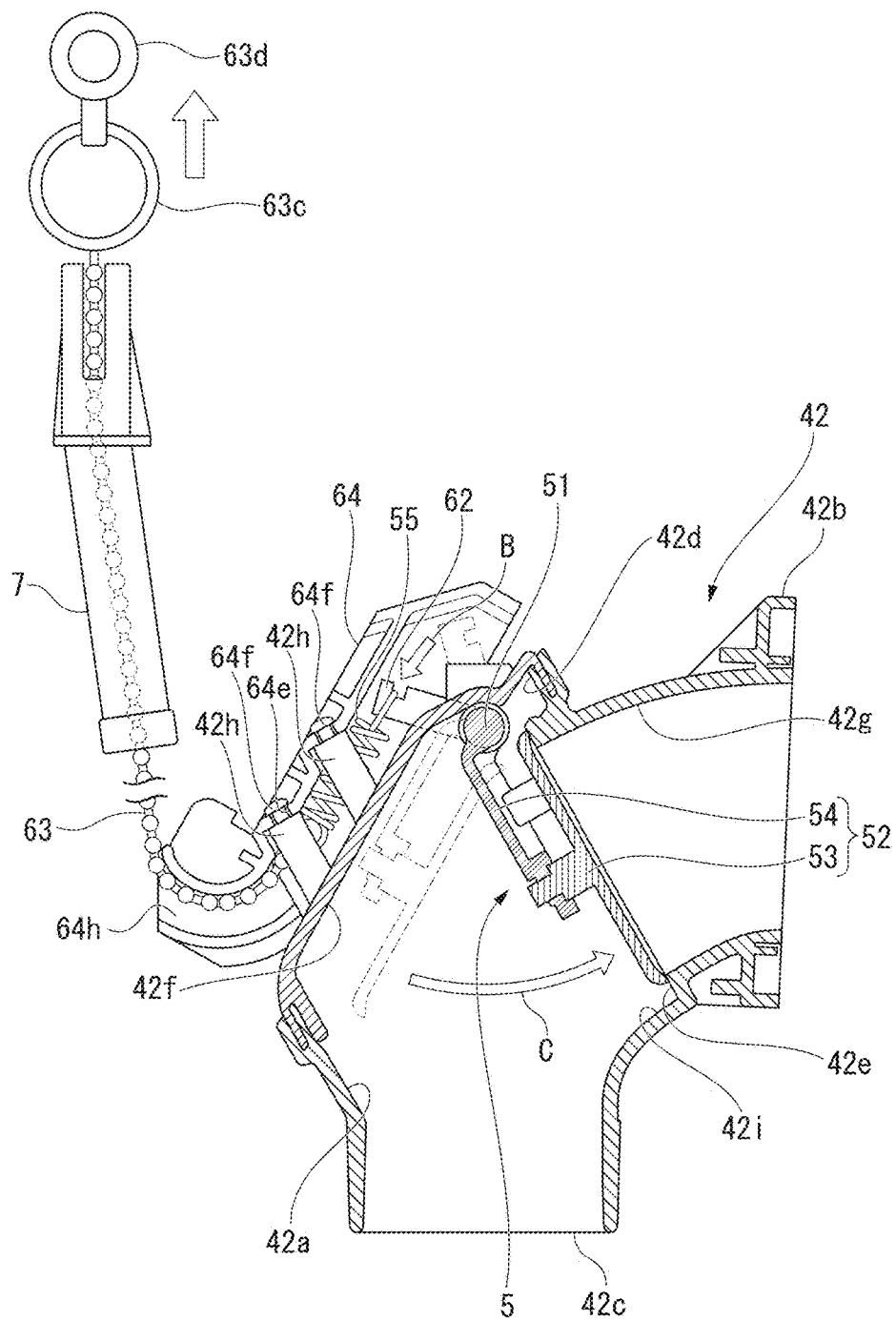
FIG. 5 is a cross-sectional view of the valve portion of the present invention.

The valve portion 5 is provided in the toilet drainage water pathway 4. Specifically, the valve portion 5 is arranged between the pooled water part 4a and the drainage water socket 10 and is positioned at the top part 4c. FIG. 3 is a side view of the valve portion 5. FIG. 4 is a cross-sectional view of the valve portion 5 in a valve open state. FIG. 5 is a cross-sectional view of the valve portion 5 in a valve closed state. The valve portion 5 includes a valve main body 42, a rotating axis 51, and a flapper 52.

The valve main body 42 is made of resin and is integrally formed. As shown in FIG. 2, a sealing material 44 is interposed between the valve main body 42 and a downstream end portion of the rising part 4b and the valve main body 42 is joined to a downstream end portion of the rising part 4b so as to keep watertight.

As shown in FIG. 3, the valve main body 42 has a drainage pipe 42a. The drainage pipe 42a forms a conduit which is curved downward between a joined part 42b that is connected to the rising part 4b and a lower end opening portion 42c that is connected to the drainage water socket 10. The drainage pipe 42a configures a portion of the toilet drainage water pathway 4.

As shown in FIG. 4, an enlarging part 42d in which the conduit enlarges than the joined part 42b side (upstream side) is provided in an upper portion (top part 4c of the toilet drainage water pathway 4) of a curve portion of the drainage pipe 42a. The enlarging part 42d is an air space portion in which the air remains when water flows. The enlarging part 42d is formed in a size such that the rotating axis and the flapper (described below) are capable of being appropriately arranged.

A step part 42e such that a conduit is larger than the joined part 42b side (upstream side) is also provided in a lower portion of the curve portion of the drainage pipe 42a.

The rotating axis is provided in the top part 4c of the toilet drainage water pathway 4. Concretely, the rotating axis is provided in the upper portion of the curve portion of the drainage pipe 42a. The rotating axis 51 extends in a direction orthogonal to the flow path, and the rotating axis 51 is attached to the the valve portion main body 42 such that both ends of the rotating axis 51 penetrate the valve portion main body 42. The rotating axis 51 is housed in the upstream side in the enlarging part 42d.

The flapper 52 is provided in the top part 4c of the toilet drainage water pathway 4. Concretely, one end portion of the flapper 52 is attached to the rotating axis 51 so as to be capable of rotating. Therefore, a connection part 5c between the rotating axis 51 and the flapper 52 is provided in the enlarging part 42d (air space portion). The flapper 52 is provided so as to be capable of closing in a direction orthogonal to the flow path in the drainage pipe (conduit) 42a.

The flapper 52 includes a plate part 53 and a supporting part 54. The plate part 53 blocks the flow path of the drainage pipe 42a, and has an area so as to be capable of rotating about the rotating axis 51 in the drainage pipe 42a. The supporting part 54 is connected to the plate part 53, and one end portion of the supporting part 54 is engaged with the rotating axis 51 so as to be capable of rotating. An end portion 53a of the plate part 53 away from the rotating axis 51 is curved so as to rise in a rotating direction. As shown in FIG. 2, the end portion 53a is configured to be capable of coming into contact with the step part 42e and blocking the flow path when water flows when water flows.

As shown in FIGS. 1 and 4, in the state where the flapper 52 opens, the plate part 53 is supported by the supporting part 54 so as to be arranged along an inner wall 42g of the upstream side of the drainage pipe 42a. Therefore, in the state where the flapper 52 is open, an inner wall 42f of the drainage pipe 42a in the enlarging part 42d and the plate part 53 are spaced apart from each other. As shown in FIG. 4, the valve portion 5 is configured so that a space S is formed between the inner wall 42f of the valve portion main body 42 and a peripheral part 53b of the flapper 52 in the state where the flapper 52 is open.

As shown in FIG. 4, a downstream end portion 42j of the enlarging part 42d is formed such that the flow path is enlarged so as to be further outward than the inner wall 42k of the lower end opening portion 42c side. That is, the downstream end portion 42j of the enlarging part 42d is formed to protrude further outward than a virtual flow path T which couples the inner wall 42g of the upstream side of the drainage pipe 42a to the inner wall 42k of the lower end opening portion 42c side and the flow path is thereby enlarged.

An opening and closing operation of the flapper 52 is performed by a rotation operation part 6. The rotation operation part 6 is provided above the enlarging part 42d in an outer surface side of the valve portion main body 42. As shown in FIG. 3, the rotation operation part 6 includes a rotating spring 61, a lever 62, a ball chain (longitudinal axis member) 63, a guide member 64, and a locking part 7 (See FIG. 2).

The rotating spring 61 is a torsion spring, and an end portion of the rotating axis 51 that is protruded to the outer surface of the valve portion main body 42 is inserted into a coil portion of the rotating spring 61. A first end portion 61a of the rotating spring 61 is contact with a spring locking part 43 that is provided in the valve portion main body 42 and a second end portion 61b is locked to the lever 62. A wall along a tangent line of a virtual circle centered at the rotating axis 51 is formed in a portion of the spring locking part 43 in which the rotating axis 51 is arranged in the outer surface of the valve portion main body 42. The first end portion 61a comes into contact with the wall, thereby restricting rotation of the rotating spring 61.

The lever 62 protrudes in a direction orthogonal to the rotating axis 51 and is engaged with the supporting part 54 of the flapper 52. The lever 62 is rotatable around the rotating axis 51. As shown in FIGS. 4 and 5, the flapper 52 rotates with a rotation of the lever 62 because the lever 62 is engaged with the supporting part 54 of the flapper 52.

The lever 62 is energized by a second end portion 62b of the rotating spring 61 in a direction shown by an arrow A in FIG. 3. The chain (longitudinal axis member) 63 is connected to a protruding end portion 62a of the lever 62 via an energizing member 55.

A first end portion 63a of the chain 63 is connected to the lever 62 side, and a second end portion 63b of the chain 63 is a longitudinal member that is provided and extended outward of the toilet main body 2. A ring 63c and a grasping part 63d are continuously provided in the second end portion 63b of the chain 63. The second end portion 63b of the chain 63 is arranged in an opening-closing operation part (operation part) 66.

Figure 6:
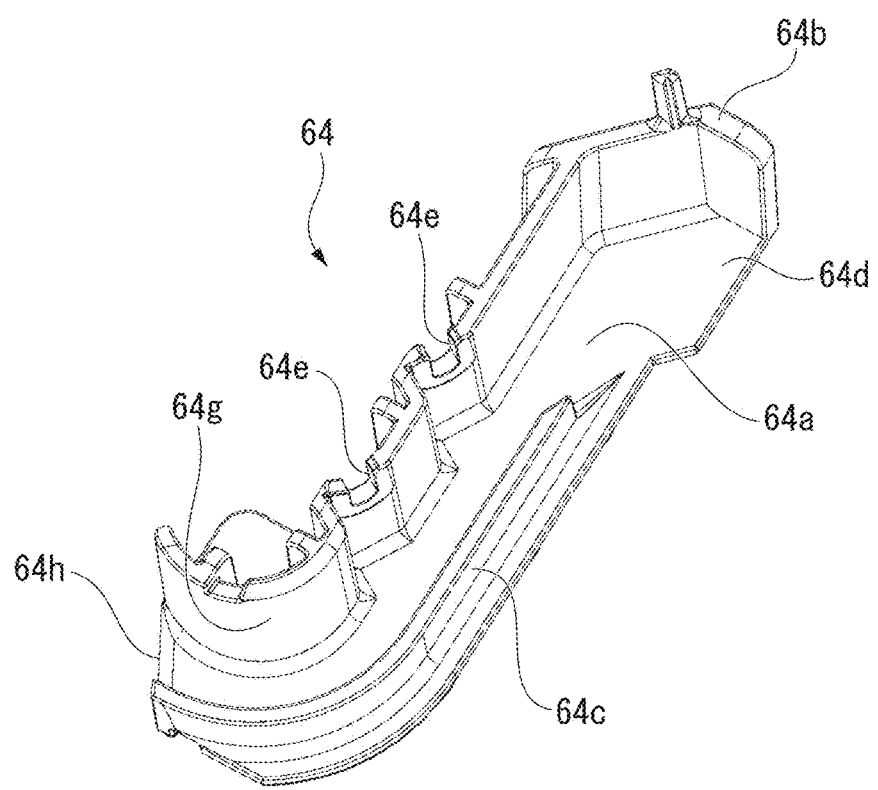
FIG. 6 is a perspective view of a guide member of the present invention.

A guide member 64 is provided above the enlarging part 42d in the outer surface side of the valve portion main body 42. A perspective view of the guide member 64 is shown in FIG. 6. The guide member 64 is a molding member made of resin, and is a member in which the lever 62, the energizing member 55, and the chain 63 are housed. The guide member 64 has a function for guiding a path of the chain 63, and a function for preventing the chain 63, the energizing member 55, and the lever 62 from falling out by an external force.

The guide member 64 is provided such that an upper guide 64b and a lower guide 64c are protruded from a side wall 64a. A lever housing part 64d is provided in an upper end portion of the guide member 64. As shown in FIG. 5, the guide member 64 is fixed in the valve portion main body 42 by inserting a screw 64f into a screw groove 64f and a screw-fastening part 42h of the valve portion main body 42. A projected amount from the side wall 64a of the upper guide 64b is larger than a projected amount from the lower guide 64c. The ball chain 63 is housed between the upper guide 64b and the lower guide 64c, and between the side wall 64a and the screw-fastening part 42h.

A lower end portion 64h of the guide member 64 is curved in a direction in which the opening-closing operation part 66 (see FIG. 1 and FIG. 7) provided outward from the toilet main body 2 is positioned. In the present invention, because the opening-closing operation part 66 is provided in an upper portion of the toilet main body 2 and the second end portion 63*b* of the chain 63 is arranged so as to extend upward from the toilet main body 2, the lower end portion 64*h* of the guide member 64 is curved upward. The guide member 64 guides the path of the chain 63 in a moving direction of the chain 63 for rotating the flapper 52 and in a towing direction of the second end portion 63*b* of the chain 63 in the outside of the toilet main body 2.

The energizing member 55 is coil spring. When the valve closes, the energizing member 55 energizes the flapper 52 so as to keep a state in which the flapper 52 closes the toilet drainage water pathway 4.

An energizing force is set in the energizing member 55 so as to cause the flapper 52 to rotate and so as to form a space that is capable flowing the water between an inner wall 42*i*, the step part 42*e*, and the flapper 52 when the flapper 52 closes and water head pressure applied to the flapper 52 by pooled cleaning water becomes equal to or more than a predetermined value. The inner wall 42*i* and the step part 42*e* are positioned at a lower side of the toilet drainage water pathway 4. The energizing force of the energizing member 55 will be described below.

Figure 8:
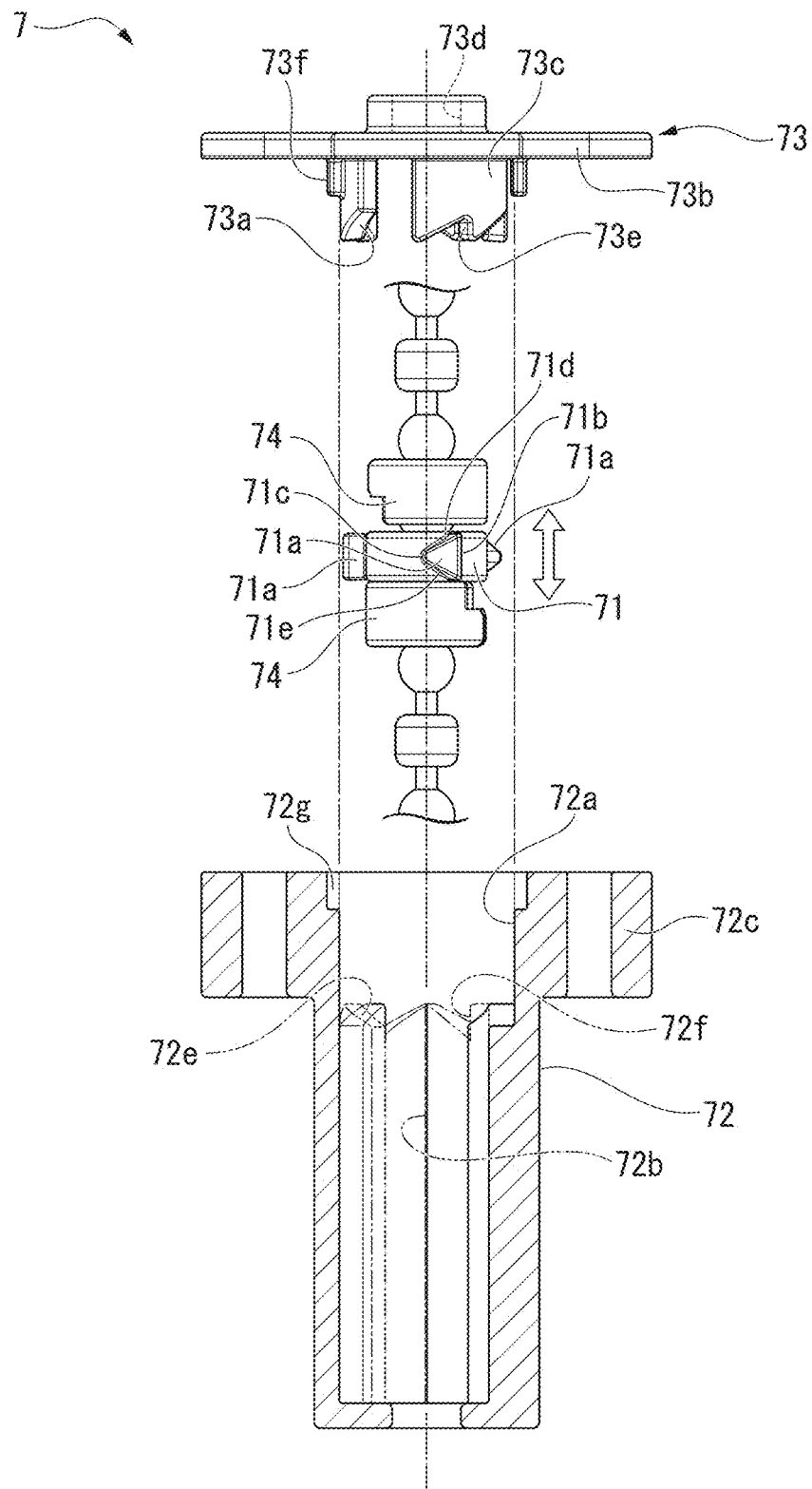
FIG. 8 is an exploded view of the locking part of the present invention.

The locking part 7 includes a knocking mechanism that holds the chain 63 in a predetermined towing position. The locking part 7 is provided on an upper side of the toilet main body 2 in which the second end portion 63*b* of the chain 63 is arranged. FIG. 8 is an exploded view of the locking part 7. The locking part 7 includes a rotator 71, a tube part 72, and a knock cam 73.

The rotator 71 is a columnar ring member in which a through hole (not shown) is provided in a center axis and the chain 63 is inserted into the through hole. Three convex parts 71*a* are formed in an outer peripheral surface of the rotator 71 at equal intervals. As shown in FIG. 8, the convex parts 71*a* are provided in the outer peripheral surface of the rotator 71 such that a triangle-shaped plate protrudes. The convex parts 71*a* are substantially triangle shape including a first side 71*b*, a second side 71*d*, and a third side 71*e*. The first side 71*b* is parallel to an axis direction of the rotator 71 (extending direction of the chain 63) and a dimension of the first side 71*b* is substantially equal to a height of the rotator 71. The second side 71*d* is an upper side connecting one end of the first side 71*b* and a top 71*c* that is positioned at a substantially center portion in a height direction of the rotator 71. The third side 71*e* is a lower side connecting the other end of the first side 71*b* and a top 71*c*.

The rotator 71 is sandwiched by a pair of retaining rings 74 provided on upper or lower surfaces of the rotator 71. The pair of retaining rings 74 is fixed in the chain 63 in a state where the pair of retaining rings 74 contact the upper surface or the lower surface. Thereby, the rotator 71 sandwiched by the pair of retaining rings 74 is configured to be not capable of moving in a longitudinal direction with respect to the chain 63 and to be capable of rotating around the chain 63.

Figure 9A:
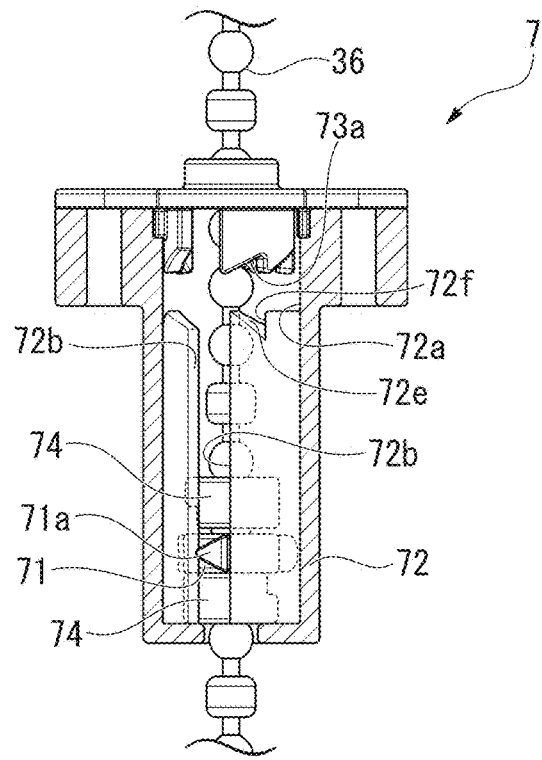
FIG. 9A is a schematic view showing a movement of the locking part of the embodiment of the present invention.

The tube part 72 is a tube member including an insertion hole 72*a* that is penetrated in a vertical direction and includes a large-diameter part 72*c* in which a diameter of an upper end portion is larger than a diameter of a lower end portion. The insertion hole 72*a* includes an opening area in which the rotator 71 and the pair of retaining rings 74 are capable of inserting, and the opening area of the lower end portion is reduced. As shown in FIGS. 8 and 9A, a guide groove 72*b* extend in the longitudinal direction from the lower end portion of the tube part 72 to the vicinity of the lower end portion of the large-diameter part 72*c* and is formed in an inner peripheral surface of the insertion hole 72*a*. The guide groove 72*b* has a dimension such that convex parts 71*a* are capable of sliding and three guide grooves 72*b* are formed in the insertion hole 72*a*. A first inclined surface 72*e* and a first vertical surface 72*f* are provided in an upper end of the guide groove 72*b*.

The knock cam 73 includes a lid member 73*b* and a knock cam portion 73*c*. An opening 73*d* into which the chain 63 is capable of inserting is provided in a center portion of the disc-shaped lid member 73*b*. A fitting protrusion 73*f* is provided in a lower surface of the lid member 73*b*.

The knock cam portion 73*c* is provided in the lower surface of the center portion so as to protrude downward. The knock cam portion 73*c* is provided around the opening 73*d* of the lid member 73*b* along the inner peripheral of the insertion hole 72*a* in a state where the knock cam portion 73*c* is inserted into the insertion hole 72*a*. A second inclined surface 73*a* and a second vertical surface 73*e* are formed in the lower end portion of the knock cam portion 73*c*.

Figure 9B:
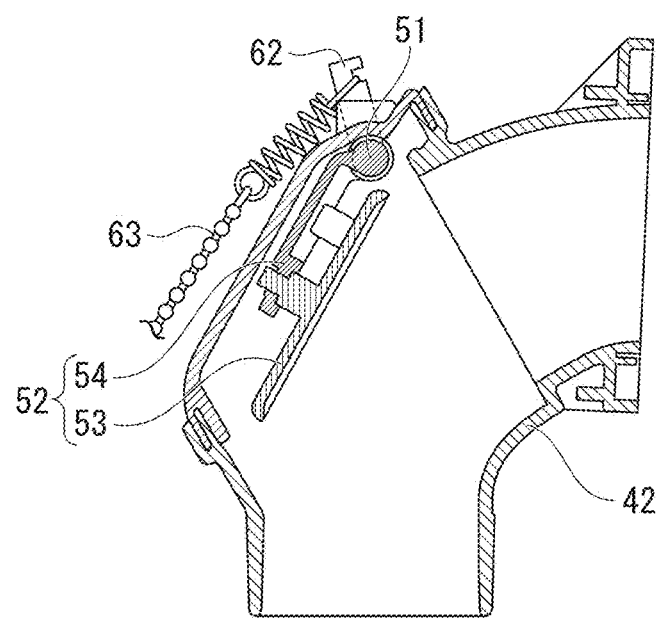
FIG. 9B is a schematic view showing a movement of the valve portion in accordance with the locking part in FIG. 9A.

As shown in FIG. 9A, the rotator 71 attached to the chain 63 and the pair of retaining rings 74 are inserted into the insertion hole 72*a* of the locking part 7 from the above of the tube part 72 and the knock cam portion 73*c* is inserted into the insertion hole 72*a*. The fitting protrusion 73*f* fits an engaging hole 72*g* that is provided on a upper surface of the tube part 72. Thereby, the lid member 73*b* is fixed to the tube part 72. The lid member 73*b* is fixed so as to be not capable of rotating with respect to the tube part 72. At this time, the first inclined surface 72*e* of the tube part 72 and the second inclined surface 73*a* of the lid member 73*b* are provided so as to be displaced in a circumferential direction. The chain 63 is provided so as to be capable of moving in the insertion hole 72*a* in the longitudinal direction (in a vertical direction of FIG. 9). The rotator 71 and the pair of retaining rings 74 are provided so as to be capable of moving in the insertion hole 72*a* between a bottom portion of an lower end of the insertion hole 72*a* and the knock cam portion 73*c* in the longitudinal direction as the chain 63 moves.

Next, a movement of a knock mechanism of the locking part 7 will be described using FIGS. 8 to 13B. A movement of the locking part 7 and a movement of the valve portion 5 in accordance with the movement of the locking part 7 will be described in FIGS. 9A to 13B.

As shown in 9B, when the flapper 52 is the open state, in the locking part 7, as shown in FIG. 9A, the rotator 71 is positioned at the lower end of the insertion hole 72*a*.

Figure 10A:
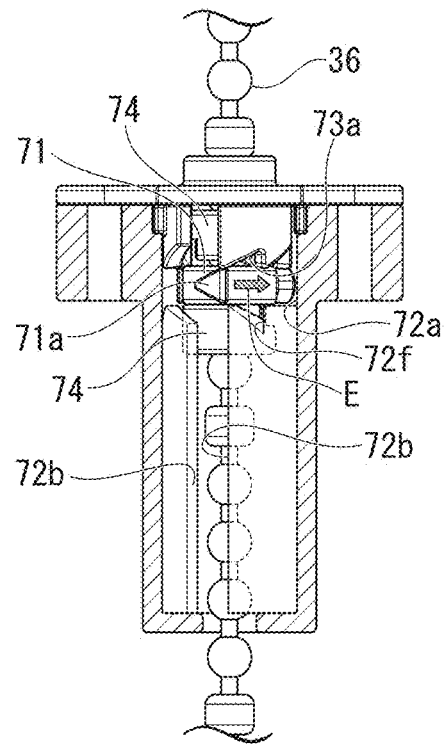
FIG. 10A is a schematic view showing the movement of the locking part of the embodiment of the present invention.
Figure 10B:
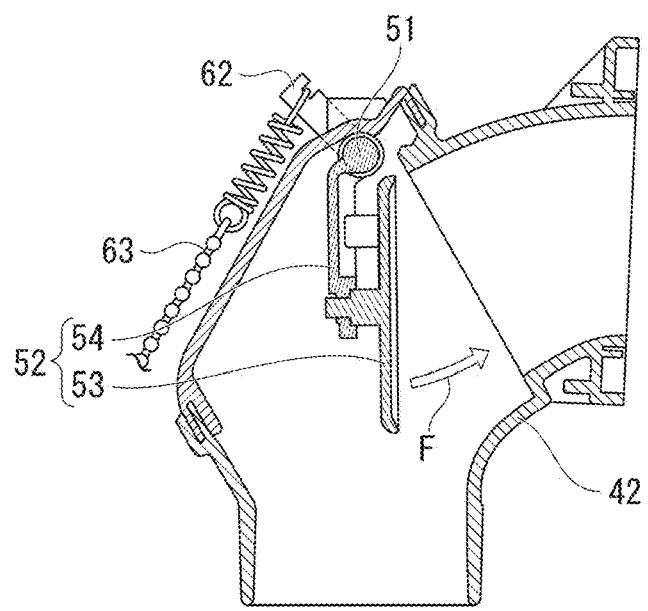
FIG. 10B is a schematic view showing the movement of the valve portion in accordance with the locking part in FIG. 10A.
Figure 11A:
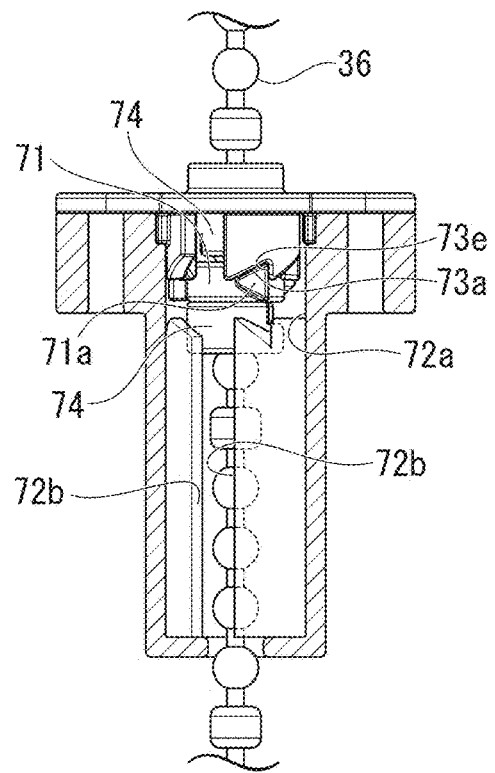
FIG. 11A is a schematic view showing the movement of the locking part of the embodiment of the present invention.
Figure 11B:
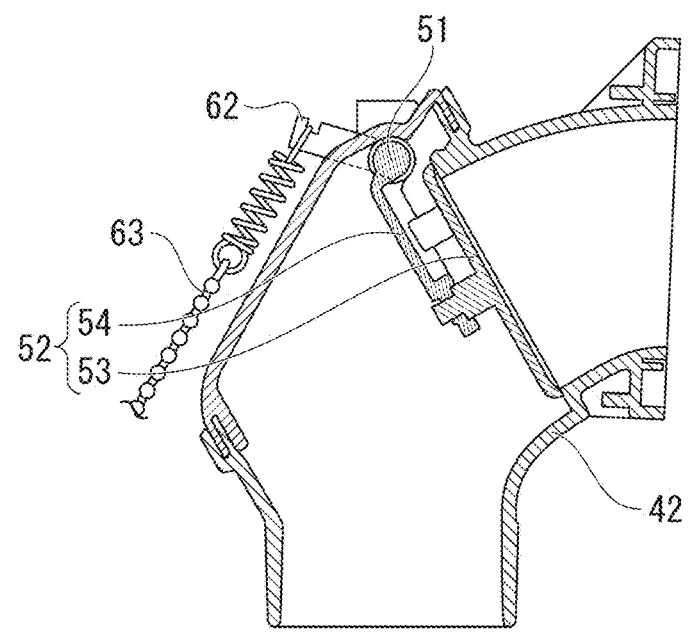
FIG. 11B is a schematic view showing the movement of the valve portion in accordance with the locking part in FIG. 11A.

In the case where the flapper 52 is closed by hand, when the user pulls the chain 63, as shown in FIG. 10A, the rotator 71 is pulled up the lid member 73*b* side and reach to the upper portion of the insertion hole 72*a*. At this time, as shown in 10B, the flapper 52 is rotated in an arrow F direction. Rotation of the rotator 71 is restricted during the convex part 71*a* of the rotator 71 slides along the guide groove 72*b*. However, when the rotator 71 pulls up an upper portion of the insertion hole 72*a* and the convex part 71*a* of the rotator 71 deviates from the guide groove 72*b*, the rotator 71 is capable of rotating. In the state where the chain 63 tows, because the second side 71*d* of the convex part 71*a* contacts with second inclined surface 73*a* of the knock cam portion 73*c*, the rotator 71 rotates in a right direction (arrow E direction of FIG. 10A). As shown in FIG. 11A, the first side 71*b* of the convex part 71*a* contacts with the second vertical surface 73*e* of the knock cam portion 73*c* and the rotation of the rotator 71 stops. In the state, because the movement of the upper direction of the chain 63 restricts, the user can recognize that the chain 63 is towed by a predetermined amount, and the tow of the chain 63 stops.

Figure 12A:
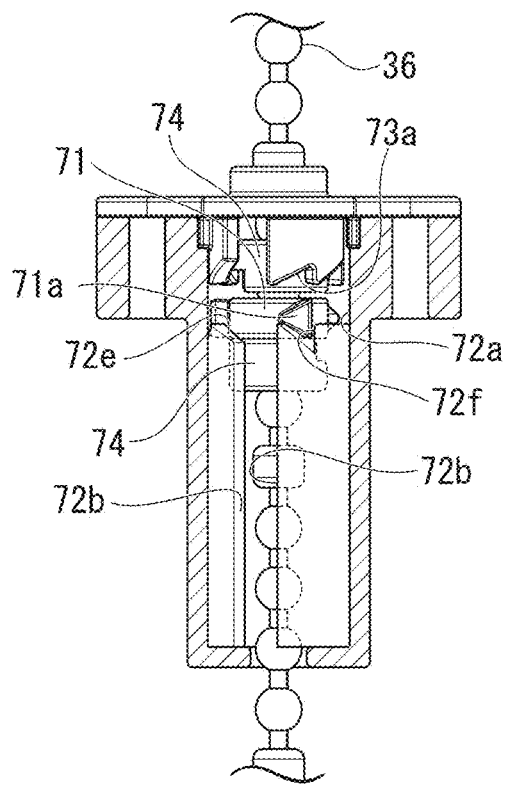
FIG. 12A is a schematic view showing the movement of the locking part of the embodiment of the present invention.
Figure 12B:
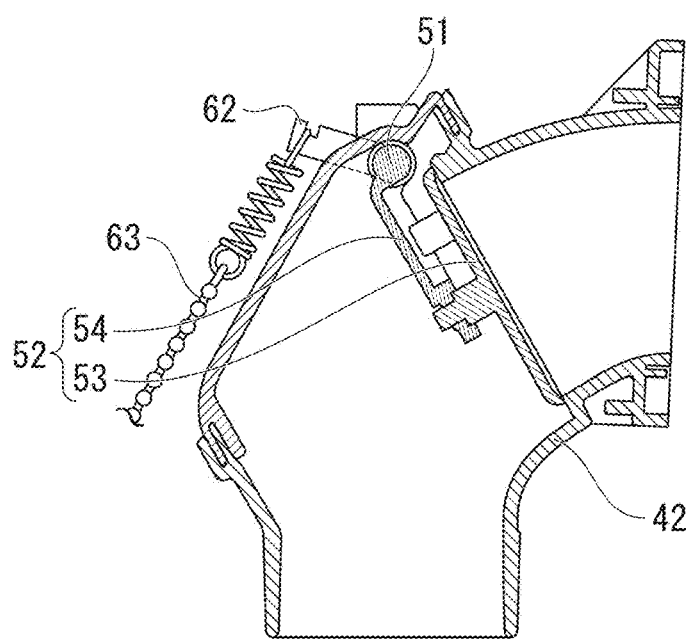
FIG. 12B is a schematic view showing a movement of the valve portion in accordance with the locking part in FIG. 12A.

When a force pulling up the chain 63 is released, as shown in FIG. 12A, the rotator 71 moves downward, the convex part 71*a* contacts with the first inclined surface 72*e* of the tube part 72, moves along the first inclined surface 72e, and the rotator 71 rotates in the right direction. When the first side 71b contacts with the first vertical surface 72f of the tube part 72, the rotation of the rotator 71 is restricted and the chain 63 is locked. As a result, as shown in FIG. 12B, the flapper 52 is held in a closed state. In a state shown FIGS. 12A and 12B, towing force is applied to the chain 63 from the rotating spring 61.

Figure 13A:
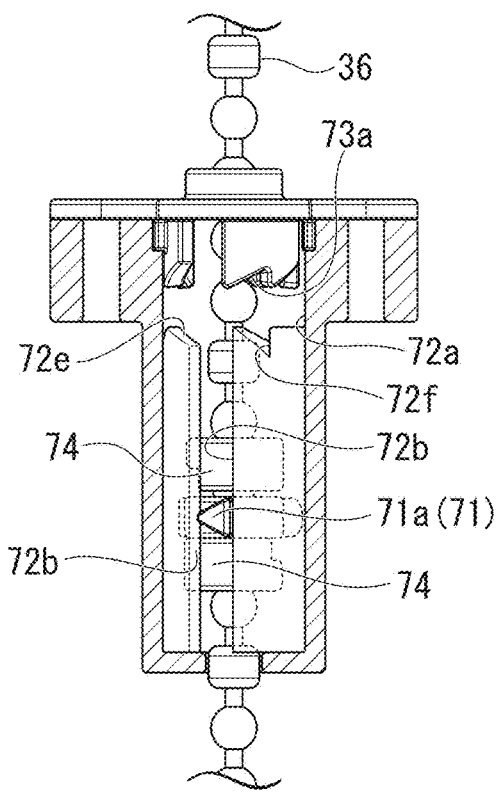
FIG. 13A is a schematic view showing the movement of the locking part of the embodiment of the present invention.
Figure 13B:
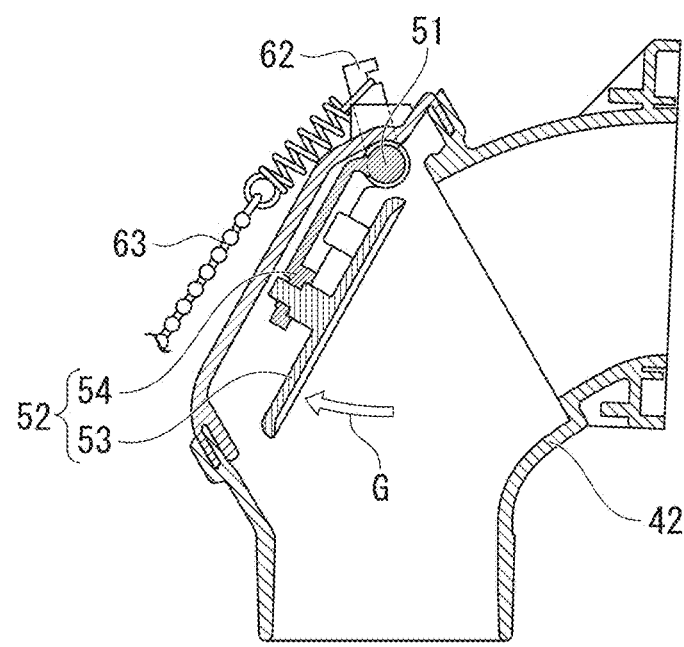
FIG. 13B is a schematic view showing the movement of the valve portion in accordance with the locking part in FIG. 13A.

Next, in a state where the flapper 52 is open, when the user tows the grasping part 63d of the chain 63 a little and a hand is released, the rotator 71 moves to upper side once, a rotation regulation of the rotator 71 in the first vertical surface 72f of the tube part 72 is released, the rotator 71 is rotated clockwise, the convex part 71a is entered in the adjacent guide groove 72b, as shown in 13A. At this time, because towing force is applied to the chain 63 from the rotating spring 61, the rotator 71 moves to the lower portion of the insertion hole 72a. As a result, as shown in FIG. 13B, the flapper 52 rotates in an arrow G direction and becomes in the closed state.

With this configuration, the locking part 7 can hold the flapper 52 in the open state or the closed state by an operation for moving the chain 63 by the predetermined distance.

The flush toilet 1 includes the cleaning water supply device 9. A manual valve operation part 81 is configured to be capable of manipulating the cleaning water supply device 9 by hand in order to flow the cleaning water to the bowl 3 and the drainage line when the power outage or the like occurs during nonconduction. The manual valve operation part 81 is provided above the toilet main body 2. The cleaning water supply device 9 and the manual valve operation part 81 are known devices and are shown in FIG. 1 schematically. The user performs the rotation operation of an upper end portion 82 of the manual valve operation part 81 around a longitudinal direction (arrow D direction of FIG. 7) by hand. Thereby, the cleaning water is supplied to bowl 3 from the cleaning water supply device 9.

Figure 7:
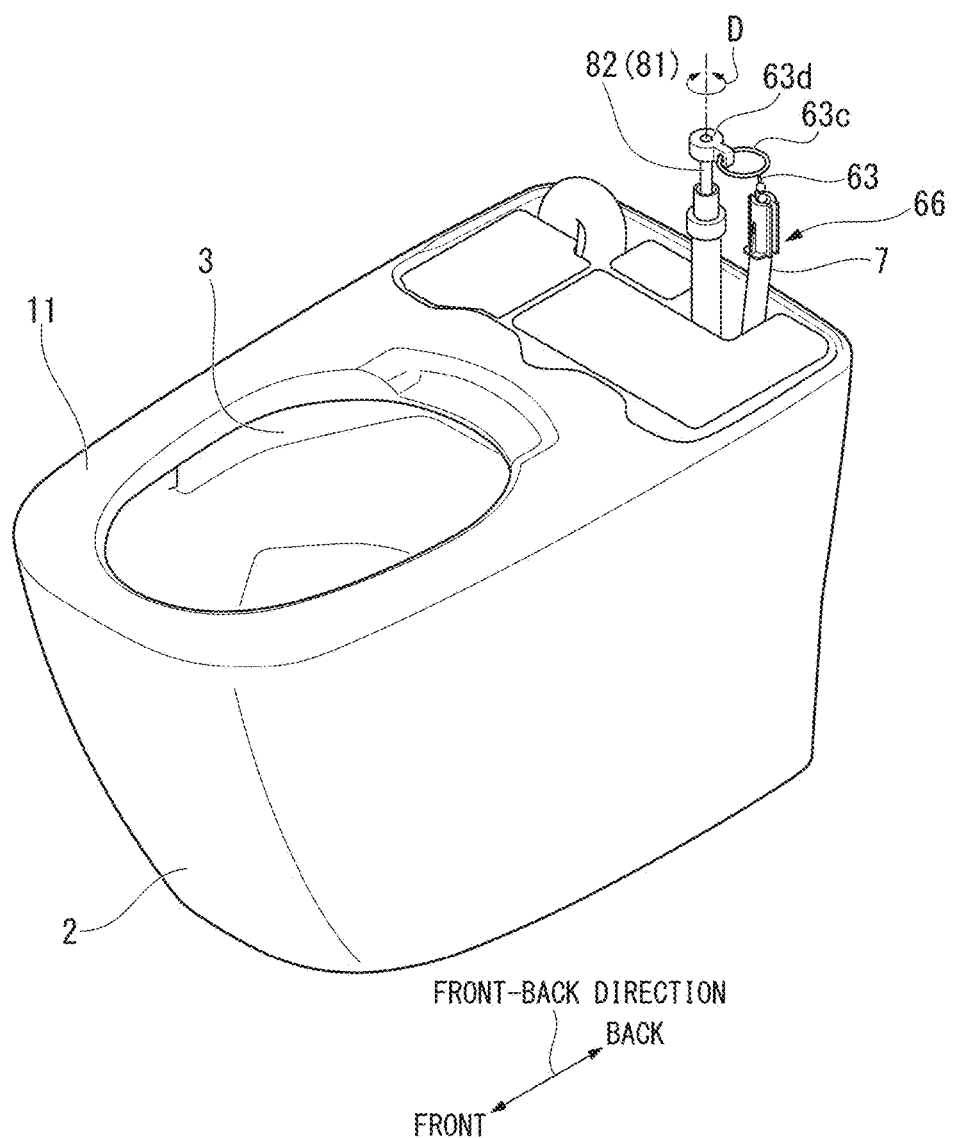
FIG. 7 is a perspective view a flush toilet of a present invention.

As shown in FIG. 7, the manual valve operation part 81 is positioned adjacent to the opening-closing operation part 66. As shown in FIGS. 5 and 7, an opening is formed in a center of the grasping part 63d and the rod shaped upper end portion 82 is capable of being inserted into the grasping part 63d. The grasping part 63d has a function as an operation lever (grasping part) of the manual valve operation part 81. When the upper end portion 82 of the manual valve operation part 81 is operated and rotated, the grasping part 63d is engaged with the upper end portion 82 and is rotated in the arrow D direction. Usually, the grasping part 63d is arranged in a state of being engaged with the upper end portion 82.

As shown in FIG. 1, an upper lid 21 that is capable of being open and closed is provided in an upper surface of the back side of the toilet main body 2 and the manual valve operation part 81 and the opening-closing operation part 66 is covered with the upper lid 21.

Next, a movement of the flush toilet 1 in the present invention during the power outage will be described. FIG. 14 shows a movement of the valve portion 5 and the flow of the cleaning water when the flush toilet 1 is washed during the power outage.

Usually (when applying current), the flapper 52 is the open state as shown in FIG. 4. When the cleaning of the toilet is performed during the power outage, the user opens the upper lid 21 and operates the manual valve operation part 81 and the opening-closing operation part 66 by hand.

Figure 14A:
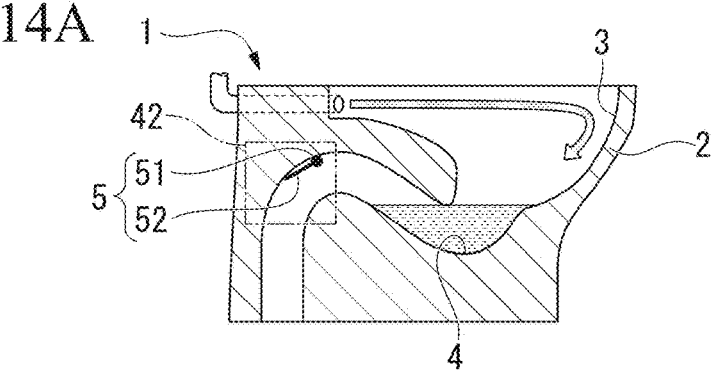
FIG. 14A is a schematic view showing the movement of the valve portion and the flow of the cleaning water when the power outage occurs in the embodiment of the present invention.

First, when the grasping part 63d that is arranged so as to fit the upper end portion 82 is rotated by 180° (degree) in a counterclockwise direction by the user, the supply of the cleaning water in the cleaning water supply device 9 is started and the cleaning water is supplied in the bowl 3 as shown in FIG. 14A. Next, when the user raises the grasping part 63d and tows the ball chain 63 upward, the ball chain 63 is towed during the ball chain 63 contacts with the curve portion 64g of the upper guide 64b of the guide member 64. As a result, the lever 62 rotates in an arrow B direction shown in FIG. 5, the flapper 52 rotates in an arrow C direction, the flapper 52 becomes the closed state, and the cleaning water is stored.

At this time, in the closed state where the end portion 53a of the plate part 53 contacts with the step part 42e, the ball chain 63 is temporarily locked by the knock mechanism of the locking part 7 so as not to tow any more. The user recognized that the flapper 52 becomes the closed state because the user feels the click feeling from the grasping part 63d. Even if the user releases his/her hand from the grasping part 63d and the closed state of the flapper 52 is held because the ball chain 63 is engaged with the locking part 7.

The user visually confirms that a necessary amount of the cleaning water is stored in the bowl 3. When the water cleaning is stored in the bowl 3, for example, if, for example, the user leaves the flush toilet 1 and the stored water is excessively supplied, the cleaning water overflows from the upper portion of the bowl 3. The energizing member 55 is applied to prevent the stored water from being excessively supplied in the bowl 3.

The water head pressure on the flapper 52 by the cleaning water when the cleaning water becomes a predetermined water level of the bowl 3 is previously measured when the flapper 52 is closed. Based on the measurement results of the water head pressure, when the water head pressure on the flapper 52 becomes equal to a prescribed value or greater, an elastic coefficient of the energizing member 55 is set such that the energizing member 55 elastically deforms and the lever 62 rotates a little in a direction in which the flapper 52 is closed. For that reason, for example, a gap in which the cleaning water of 12 liters per minute flows is formed between the inner wall of the toilet drainage water pathway 4 and the flapper 52. Because this energizing member 55 is provided, when the stored water of the bowl 3 becomes equal to a prescribed value or greater, the cleaning water is drained little by little to a downstream side than the flapper 52 of the toilet drainage water pathway 4, it can prevent the cleaning water from overflowing from the upper portion of the bowl 3.

Figure 14B:
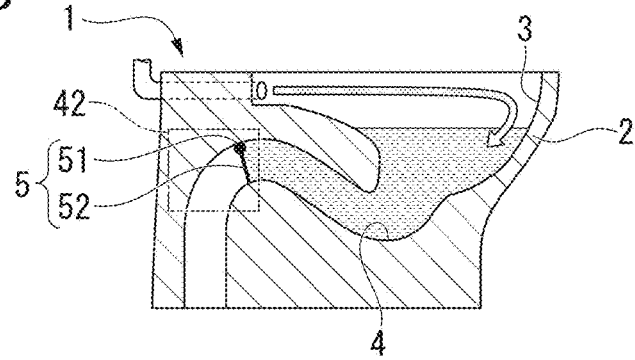
FIG. 14B is a schematic view showing the movement of the valve portion and the flow of the cleaning water when the power outage occurs in the embodiment of the present invention.

A shown in FIG. 14B, when the stored enough water is obtained in the bowl 3, the user pulls up the grasping part 63d and tows the ball chain 63. At this time, by the above knock mechanism of the locking part 7, the engagement between the rotator 71 and the guide groove 72b is released and the rotator 71 rotates in the right direction, the ball chain 63 pulls by the rotating spring 61, and the rotator 71 moves downward to the lowermost part of the tube part 72. As a result, the flapper 52 becomes the open state. Accordingly, when the ball chain 63 pulls a little and a lock state of the ball chain 63 is released, the flapper 52 can be returned to the open state.

Figure 14C:
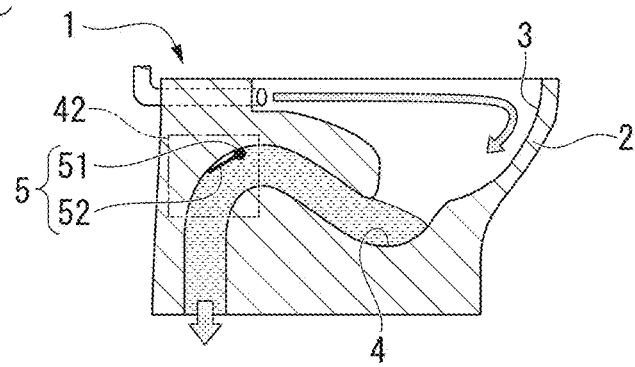
FIG. 14C is a schematic view showing the movement of the valve portion and the flow of the cleaning water when the power outage occurs in the embodiment of the present invention.
Figure 14D:
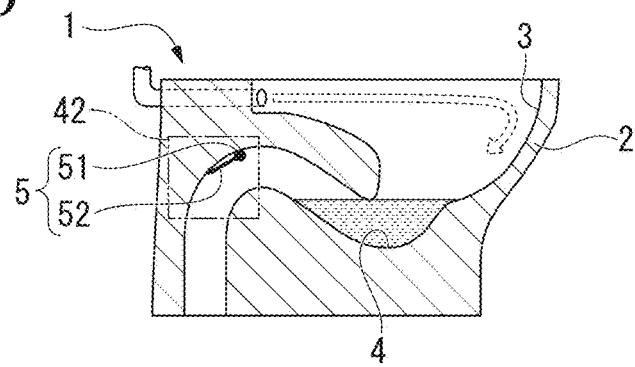
FIG. 14D is a schematic view showing the movement of the valve portion and the flow of the cleaning water when the power outage occurs in the embodiment of the present invention.

When the flapper 52 is returned to the open state, as shown in FIG. 14C, as with the usual state, the cleaning water flows to the toilet drainage water pathway 4, the siphon phenomenon occurs, and the cleaning water flows from the bowl 3 to the drainage line side. When the grasping part 63d that is fitted to the upper end portion 82 of the manual valve operation part 81 is rotated by 180° (degree)

in a clockwise by user and the supply of the cleaning water in the cleaning water supply device 9 is stopped, as shown in FIG. 14D, the cleaning of the toilet is completed. The user closes the upper lid 21.

According to the flush toilet 1 of the present embodiment, because the valve portion 5 is provided in the toilet drainage water pathway 4, even if the position of the discharge pipe that is provided in a setting place of the flush toilet 1 is provided in the floor (drainage water socket is connected to the floor) and even if the position of the discharge pipe is provided in the wall (drainage water socket is connected to the wall), it is not necessary to change the configuration of the valve portion 5. Accordingly, most of parts of the toilet in which the drainage water socket is connected to the floor and the toilet in which the drainage water socket is connected to the wall can be common and the versatility can be enhanced.

According to the flush toilet 1 of the present embodiment, the valve portion 42 and the flapper 52 that are made of resin can be provided in a part of the toilet drainage water pathway 4. Consequently, although it is difficult to provide the valve portion 5 in the toilet drainage water pathway 4 in a conventional toilet, it can provide the valve portion 5 in the toilet drainage water pathway 4 in the flush toilet 1 of the present invention.

According to the flush toilet 1 of the present embodiment, because the valve main body 42 is made of resin and is integrally formed, there is not a join or the like of the toilet drainage water pathway 4 (drainage line). Accordingly, it can prevent sewage water and waste from adhering to the toilet drainage water pathway 4.

According to the flush toilet 1 of the present embodiment, the rotating axis 51 and the connection part 5c between the rotating axis 51 and the flapper 52 are provided in the enlarging part 42d of the toilet drainage water pathway 4 (top part 4c of the toilet drainage water pathway 4) in which the sewage water and the waste make it difficult to reach during draining. Accordingly, it prevents the sewage water and the waste from adhering to the connection part 5c.

According to the flush toilet 1 of the present embodiment, because the upper portion of the conduit of the enlarging part 42d is formed to be larger than the upstream side in the downward side, it is difficult for the sewage water and the waste to reach the enlarging part 42d during draining. Because the connection part 5c between the rotating axis 51 and the flapper 52 is provided in this enlarging part 42d, it can prevent sewage water and waste from adhering between the rotating axis and the connection part of the flapper.

According to the flush toilet 1 of the present embodiment, because the space S is formed between the inner wall of the toilet drainage water pathway 4 (enlarging part 42d) and the peripheral part 53b of the flapper 52 in the state where the flapper 52 is the open state, a siphon effect can be enhanced during draining of the cleaning water and it is easy to control the flow of discharged water during draining. Because the downstream end portion 42j of the enlarging part 42d is formed so as to protrude further outward than a virtual flow path T of the drainage pipe 42a, even if the valve portion 5 is provided in the toilet drainage water pathway 4, enough of a siphoning effect can be obtained during draining of the cleaning water.

While the embodiment of the present invention have been described and illustrated above, the present invention is not limited by the description above, and other modifications of components can be made without departing from the concept of the invention.

Furthermore, constituent elements of the respective embodiments and modified examples can be appropriately combined.

For example, in the valve portion, a sealing portion (not shown) may be provided in the peripheral part 53b of a surface in which the flapper 52 faces the inner wall of the toilet drainage water pathway 4 when the valve portion opens. Because this configuration maintains a watertight seal between the flapper 52 and the inner wall of the toilet drainage water pathway 4 when the valve portion opens, the sewage water and the waste can be prevented from flowing in between the flapper 52 and the inner wall of the toilet drainage water pathway 4.

In the present embodiment, an example in which the valve portion main body 42 is arranged in the top part 4c and the descending part 4d. The valve portion main body 42 may be provided in the toilet drainage water pathway. For example, the valve portion main body may be provided in the top part from the intermediate of the rising part and the area of the descending part and between the pooled water part and the drainage water socket, and the drainage line that is curved at a position including a part of the rising part and the descending part may be formed in the valve portion main body.

The longitudinal member is not limited by the ball chain and a longitudinal member that has strength in which the rotation axis is rotated by being pulled outward from the toilet main body may be used, such as, for example, a wire, a chain, or the like.

Although three convex parts 71a and three guide grooves 72b are provided in the locking part 7 in the present embodiment, a plurality of convex parts 71a and three guide grooves 72b may be provided and the configuration of the present embodiment is not limited to three.

Although the locking part 7 in the present embodiment includes the knock mechanism, the locking part is not limited by this configuration. For example, a hook that the ball chain is capable of engaging with and disengaging from may be provided in the vicinity of the operation part or the vicinity of the rotation axis and the ball chain may engage with the hook in the state of being pulled by the ball chain.

Although the locking part 7 is provided in the upper side of the toilet main body 2 in which the grasping part 63d of the ball chain 63 is arranged in the present embodiment, the locking part 7 may be provided in an arbitrary position on the path of the longitudinal member.

Although the locking part 7 is provided in the present embodiment, the locking part 7 is not essential.

Although the energizing member 55 is provided in the present embodiment, the energizing member 55 is not essential. Furthermore, the coil spring is used as the energizing member 55, any kind of springs may be used.

Providing the enlarging part 42d prevents the sewage water and the waste from adhering to the connection part 5c, because the connection part 5c between the rotating axis 51 and the flapper 52 is provided in an area that does not interfere with a water flow area of the toilet drainage water pathway 4.

Although the drainage pipe 42a is provided in the enlarging part 42d in the present embodiment, the drainage pipe 42a is not essential in the purpose of opening and closing the flow path of the toilet drainage water pathway 4 in the non-conducting state.

Although the step part 42e is provided in the lower portion of the drainage pipe 42a in the present embodiment, the step part 42e is not essential. The flapper may be capable of stopping the water by contacting with the inner wall of the drainage pipe 42a.

Although the opening-closing operation part 66 is provided in the upper portion of the toilet main body 2, a setting positon of the opening-closing operation part 66 is not limited to the upper portion. For example, the opening-closing operation part 66 may be provided in a side or the like of the toilet main body 2. At this time, in guide member 64, the guide path of the longitudinal member may be formed in accordance with the setting position of the tube member or the like.

The guide member 64 shown in the present embodiment is, for example, a member that guides the path of the tube member or the longitudinal member and that houses and is thereby capable of protecting the lever and the longitudinal member may be used.

REFERENCE SIGNS LIST

1: flush toilet
3: bowl
4: toilet drainage water pathway
5: valve portion
10: drainage water socket
42: valve portion main body
42*a*: drainage pipe
42*d*: enlarging part
42*f*: inner wall
51: rotating axis
52: flapper
53*b*: peripheral part
5*c*: connection part

What is claimed is:

1. A flush toilet comprising:
   a bowl;
   a toilet drainage water pathway which communicates with the bowl and a drainage water socket and into which a cleaning water flows from the bowl; and
   a valve portion which includes a rotating axis and a flapper, and which is configured to open and close the toilet drainage water pathway, the rotating axis being provided in the toilet drainage water pathway, the flapper being connected to the rotating axis and being provided so as to be capable of rotating about the rotating axis, wherein the rotating axis and a connection part between the rotating axis and the flapper are in a top part or a downstream side of the top part.

2. The flush toilet of claim 1, wherein
   the valve portion includes a valve portion main body which configures a portion of a toilet drainage water pathway,
   the rotating axis and the flapper are provided in the valve portion main body, and
   the valve portion main body and the flapper are made of resin.

3. The flush toilet of claim 2, wherein
   the valve portion main body is formed as a single body.

4. A flush toilet comprising:
   a bowl;
   a toilet drainage water pathway which communicates with the bowl and a drainage water socket and into which a cleaning water flows from the bowl; and
   a valve portion which includes a rotating axis and a flapper, and which is configured to open and close the toilet drainage water pathway, the rotating axis being provided in the toilet drainage water pathway, the flapper being connected to the rotating axis and being provided so as to be capable of rotating about the rotating axis,
   wherein an enlarging part which has an upper portion which is larger than an upstream side at least in a height direction is provided in a conduit, the cleaning water of the valve portion main body flowing in the conduit; and
   the enlarging part includes the rotating axis and a connection part between the rotating axis and the flapper.

5. The flush toilet of claim 1, wherein
   the valve portion is configured such that a gap is formed between an inner wall of the toilet drainage water pathway and a peripheral part of the flapper in a state where the flapper is open.

6. A flush toilet comprising:
   a bowl;
   a toilet drainage water pathway which communicates with the bowl and a drainage water socket and into which a cleaning water flows from the bowl; and
   a valve portion which includes a rotating axis and a flapper, and which is configured to open and close the toilet drainage water pathway, the rotating axis being provided in the toilet drainage water pathway, the flapper being connected to the rotating axis and being provided so as to be capable of rotating about the rotating axis,
   wherein the valve portion is configured so as to maintain a watertight seal between an inner wall of the toilet drainage water pathway and a peripheral part of the flapper that faces the inner wall of the toilet drainage water pathway in a state where the flapper is open.

* * * * *